Nov. 14, 1950 P. W. MARTIN 2,530,308
APPARATUS FOR DETERMINING MOVABILITY OF MEMBERS IN WELLS
Filed Sept. 28, 1945 2 Sheets-Sheet 2
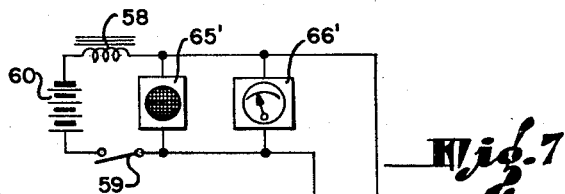
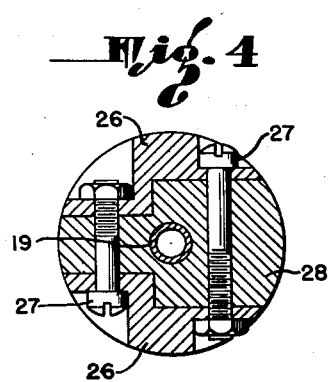
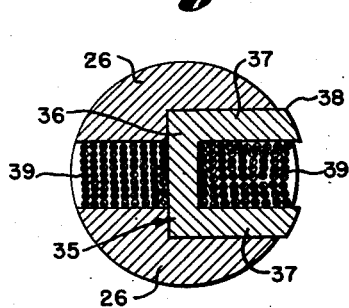
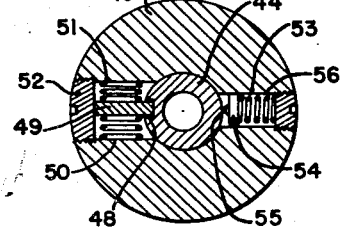
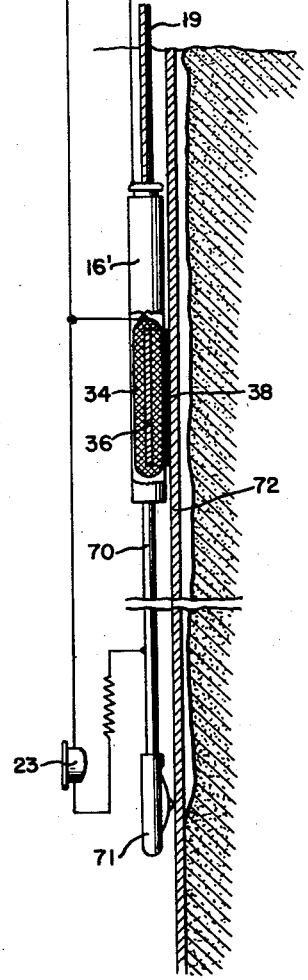
INVENTOR.
PHILIP W. MARTIN
BY
ATTORNEY

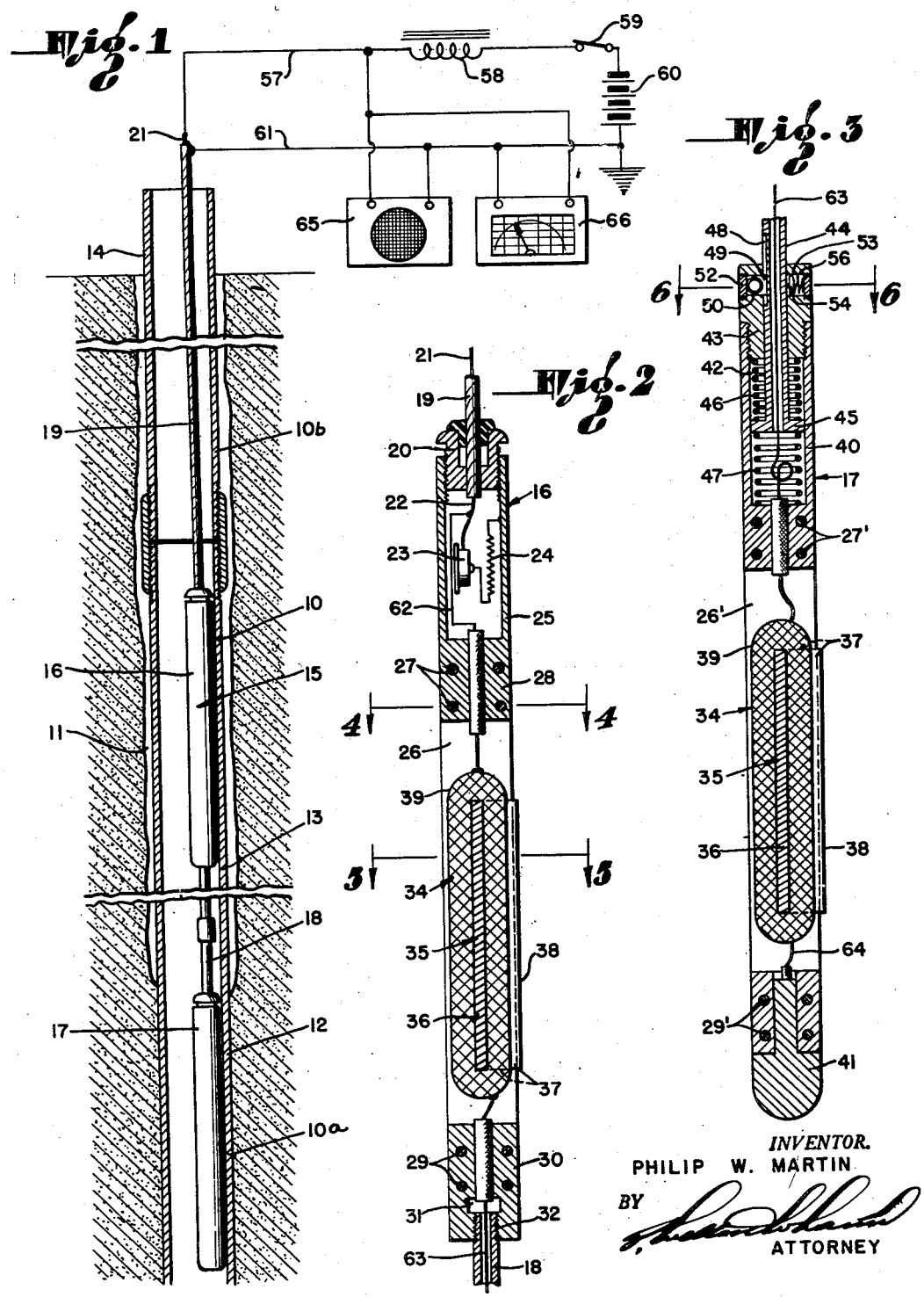

Patented Nov. 14, 1950

2,530,308

UNITED STATES PATENT OFFICE 2,530,308

APPARATUS FOR DETERMINING MOVA-
BILITY OF MEMBERS IN WELLS

Philip W. Martin, Huntington Park, Calif.

Application September 28, 1945, Serial No. 619,242

17 Claims. (Cl. 73—151)

My invention relates to a device adapted to be lowered into a well for determining relative movement between parts in the well or for determining whether a selected portion of a pipe in a well is movable by observing whether a change in the stress applied to the pipe produces a change in the form of the selected portion of the pipe in the well.

One important utility of the invention is to find the point in the well where a casing, drill pipe or tubing may be stuck by the measurement of the change in form of the casing, drill pipe or tubing when stress is applied thereto at the surface of the well or at a selected point within the well. A specific example of the utility of the invention is where a drill pipe becomes stuck in the well at an unknown distance below the surface of the ground. If a pull is applied to the upper end of the stuck pipe, there will be an extension or stretching of the pipe throughout the entire length thereof above the point in the well at which the pipe is stuck, but this pull upon the pipe will not produce an extension of that portion of the pipe which is stuck or which extends below the stuck part.

It is an object of the present invention to provide a device which may be lowered within the stuck pipe by which a workman at the top of the well may determine whether the portion of the pipe adjacent the device in the well moves or stretches when a pull is applied to the upper end of the pipe. By lowering the device throughout consecutive positions within the pipe the workman may make a number of observations of whether the pipe moves or stretches in response to a pull applied to its upper end. Through use of the device he will observe that the pull on the pipe will produce a stretch therein until the device reaches the point at which the pipe is stuck in the well, but at the stuck point and therebelow the device will produce no indication of stretch in the pipe, thereby indicating to the workman the point at which the pipe is stuck in the well. When this point is determined a cutting off tool may be lowered into the drill pipe and the drill pipe may be cut off at or immediately above the point at which it is stuck in the well; whereupon the portion of the drill pipe above the cut may be pulled from the well. In the foregoing manner a great deal of time in the recovery of drill pipe stuck in the well is saved, and the possibility of losing drill pipe in the well is minimized.

It sometimes occurs that a pipe, for example, the drill pipe, may become stuck in a well at an intermediate point, the portions of the drill pipe above and below that portion which is stuck being free. It is possible by use of the invention to determine the length and position of that portion of the drill pipe which is stuck in the well. When this knowledge is obtained it will be possible, under some circumstances, to jar loose the portion of the drill pipe which is stuck by the firing of an explosive charge within the stuck portion; whereupon the drill pipe may be pulled from the well without the necessity of cutting it.

It is an object of the invention to provide a device which may be lowered through consecutive positions within a well, this device having an anchor member equipped with means for connecting or affixing it to a part in the well, the device also having means associated with the anchor member which will indicate relative movement of another part in the well. For example, in the preferred form of the invention the device is provided with an anchor member having means for attaching it to one part of a pipe in the well and a means which will indicate relative movement of another or adjacent part of this pipe when the value of the stress applied to the pipe is changed. It will be understood that when a pull is applied to the upper end of a pipe, the change in the stress applied to the pipe will produce an elongation or extensile change in form of the pipe, and that when the value of this stress is changed—for example, a decrease in the stress—the change in the form of the pipe will consist in contraction or shortening of all portions of the pipe in which the stress is relieved. Also, the stress applied to the pipe to deform the same may be torsional instead of tensile, under which circumstances all portions of the pipe between the stuck point and the point at which the stress is applied will deform in torsion or, in other words, twist, thereby changing the relation of consecutive portions of the pipe, such changes in relation being observed or indicated by the device. These changes in torsional relation will be indicated when the torsional stress is applied and when it is relieved.

A further object of the invention is to provide a device of the general character referred to in the foregoing having associated with the anchor means thereof a means which responds to relative movement or change in relative position of another part in the well to produce an indication of this relative movement, the invention having means for transmitting to a workman at the top of the well knowledge of the indication and therefore knowledge of the relative movement whereby the workman may determine whether the stress applied at the top of the well has accomplished relative movement of the part to which the anchor is connected and another part adjacent thereto.

A further object of the invention is to provide a device of the character set forth in the preceding paragraph wherein the relative movement between parts in a well produces an electrical effect, which electrical effect is employed at the top of the well to produce an indication of the relative movement.

A further object of the invention is to produce a device of this character wherein relative movement between the parts in the well produces sound vibrations which are transmitted to the top of the well where they may be observed or recorded.

A further object of the invention is to produce a device of this character wherein relative movement of adjacent parts in the well is employed to change the resistance of an electrical resistance element which controls the electrical potential in a circuit which extends to the top of the well, there being means at the top of the well responding to the variations in the electrical potential of the circuit to produce a sensible indication of the relative movement of the parts in the well.

A further object of the invention is to provide a device of the character set forth in the foregoing having two relatively movable members or anchors, with means for connecting these members to separate parts in the well, so that relative movement of the parts in the well will produce relative movement of the members connected thereto, the device also having means for indicating to an operator at the top of the well relative movement of the members.

A further object of the invention is to provide a testing device of the character set forth herein having a normal form of electromagnet for producing attachment of one or more parts of the device to a metal wall, such as the metal wall of a pipe in the well, this electromagnet being of such slender form that the testing device may be made of a diameter which will pass through the opening through devices or tools such as are employed in wells, such, for example, as a spear, it being possible, therefore, to lock the spear to the pipe in the well so as to transmit force to the pipe and to lower the device into or through the spear for the purpose of making observations of relative movement of parts either above or below the point in the well where the pipe or an intermediate part of the pipe may be fixed against movement.

An important utility of the invention is to determine the length of pipe that is securely cemented in a well. In one of its forms the device employs only one magnet for attachment to the pipe in the well, there being a microphone connected to the device for picking up sound resulting from movement of the pipe in the formation.

Further objects and advantages of the invention will be brought out in the following part of the specification.

Referring to the drawings which are for illustrative purposes only,

Fig. 1 is a schematic view showing a preferred embodiment of my invention in a pipe which extends down into a well.

Fig. 2 is an enlarged sectional view of the upper portion of the device.

Fig. 3 is an enlarged sectional view of the lower portion of the device.

Fig. 4 is a section taken as indicated by the line 4—4 of Fig. 2.

Fig. 5 is a cross section taken as indicated by the line 5—5 of Fig. 2.

Fig. 6 is a cross section taken as indicated by the line 6—6 of Fig. 3.

Fig. 7 is a schematic view showing an alternative form of the invention.

As an example of the utility of my invention I have, in Fig. 1, shown a pipe 10 stuck in a well 11 at the height or position 12. The pipe 10 is representative of any member which may be employed in a well, movement of which within the well will impart to a workman information as to conditions within the well. For example, the pipe 10 may be a casing, drill pipe or tubing. 10a may be referred to as the stuck portion of the pipe and 10b may be referred to as the free portion of the pipe. It will be understood that when the pipe is standing in the well without any pull exerted on its upper end, the lower part 13 of the free portion 10b will be under compression due to the weight of the pipe portion 10b extending upwardly therefrom, and that the upper part 14 of the free portion 10b will be substantially unloaded due to weight of the metal in the pipe. If a pulling stress is applied to the upper end of the pipe 10 which projects from the upper end of the well, the free portion 10b will be elongated an amount depending upon upward pull applied to the pipe. The unit change in form, or elongation, in the free portion 10b of the pipe will be substantially constant throughout its entire length for the reason that the change in stress applied to the pipe due to the upward pull thereon will be substantially the same throughout its entire length above the set portion 10a. That is to say, if an upward pull of 10,000 pounds is applied to the upper end of the free portion 10b, the change in stress throughout the entire length of the free portion 10b will be 10,000 pounds and therefore every portion of the pipe 10 above the stuck portion 10a will elongate due to the change in stress thereon.

The testing device 15, shown in Fig. 1, consists of vertically spaced upper and lower members 16 and 17 connected together by a slender tubular part 18 so that they may have relative movement, this device 15 being supported by a cable 19 so that it may be moved through consecutive positions within the pipe 10. As shown in Fig. 2, the lower end of the cable 19 is connected by a cable clamp 20 to the upper end of the member 16. The cable 19 has an insulated conductor 21 extending therethrough, the lower end 22 of the conductor 21 being connected to one side of a variable resistance element 23 which in the form of the invention disclosed consists of a microphone of standard type employing carbon granules as a variable resistance means. The opposite side of the resistance element or microphone 23 is connected through a fixed current limiting resistance 24 with the metal wall of the member 16, which member 16 is grounded to the cable 19.

The microphone 23 is carried within the upper cylindric body part 25. A pair of spaced bars 26 are connected by bolts 27 to the lower flattened extension 28 of the body 25. By bolts 29 the lower ends of the bars 26 are connected to the lower cylindric body 30 of the member 16, which body 30 has an axial opening 31 threaded at 32 to receive the upper end of the tubular connecting member 18. In the vertically elongated space 33 between the bars 26 there is a vertically elongated electromagnet 34.

The electromagnet 34, as shown in Figs. 2 and 5, has a vertically elongated soft iron core 35 of U-shaped cross section. As shown in Fig. 5, this core 35 has a base plate 36 disposed substantially on the center line of the tool, and a pair of outwardly extending side plates 37 which project at 38 slightly beyond the cylinder defined by the outer curved surfaces of the side bars 26, so that these side plates 37 of the core 35 project slightly from the member 16 for engagement with the wall of the pipe into which the testing device is inserted. An electromagnet winding 39, in the form of a vertically elongated loop, is wound upon the base plate 36 of the core 35, as shown in Fig. 2, the vertical extension of the winding 39 extending respectively within the spaces provided between the side plates 37 of the core 35 and the side bars 26.

The lower member 17 of the device includes a similar electromagnet 34 and therefore the respective parts of this electromagnet 34 of the lower member 17 are designated by the same numerals as employed in conjunction with the upper electromagnet 34. The lower electromagnet 34 is held between side bars 26' of non-magnetic metal, such as brass or bronze, these side bars 26' being of identical form to the side bars 26, and being connected at their upper ends by bolts 27' to the upper cylindrical body portion 40 of the lower member 17, and being connected at their lower end by bolts 29' to the lower body 41. The upper cylindrical body 40 has an upwardly spaced opening 42, threaded at its upper end to receive an axially bored plug 43 through which the lower tubular part 44 of the connecting member 18 has limited sliding movement. The part 44 has an axial opening therethrough and at its lower end has a flange 45 which is disposed between upper and lower compression springs 46 and 47 which are received within the opening 42 below the plug 43. The springs 47 and 46 yieldably position the flange 45 in an intermediate position in the opening 42 so that the lower member 17 may have relative movement with respect to the upper member 16.

As shown in Figs. 3 and 6, the part 44 which passes through the plug 43 has a keyway 48 therein which is engaged by a yieldably supported key 49 positioned in a recess 50 in the plug 43 between a pair of compression springs 51, the outer end of the recess 50 being closed by a threaded plug 52. The purpose of the key 49 is to maintain the upper and lower magnets 34 in alignment when no torsional strains are produced between the upper and lower members 16 and 17, the key 49 being yieldably supported so that there may be torsional relative movement between the upper and lower members 16 and 17.

The plug 43 has an opening 53 in which a small body 54 is slidable, this body 54 having a needle 55 engaging the surface of the part 44, there being a spring 56 behind the body 54 for urging the needle 55 into engagement with the member 44. The surface of the member 44 adjacent the point of the needle 55 is roughened so that when there is relative movement between the part 44 and the lower member 17, resulting from relative movement of the upper and lower members 16 and 17, the needle 55 will slide over the roughened surface of the member 44 and produce vibrations which will be transmitted through the member 18 and the upper member 16 to the microphone, causing variations in the resistance of the microphone which will result in electrical fluctuations in the electrical circuit of which the microphone 23 is a part. It will be understood that either linear or torsional relative movement of the upper and lower members 16 and 17 will produce, through the action of the needle 55, sound vibrations which will be picked up by the microphone 23.

As shown in Fig. 1, the upper end of the cable wire 21 is connected through a conductor 57, an inductance 58 and a switch 59 with one terminal of a source of electric current shown as a battery 60. The other terminal of the battery 60 is connected to a conductor 61 with the upper end of the cable 19, the lower end of which is grounded to the metal wall of the testing device 15. As shown in Fig. 2 the lower end of the cable wire 21 is connected to a conductor 62 with the winding 39 of the upper electromagnet 34, and the upper winding 39 is connected with the winding 39 of the lower electromagnet 34 by a conductor 63, the opposite end of the lower winding 39 being connected, as shown in Fig. 3, to the grounded metal structure of the testing device 15 by a conductor 64. To the electric circuit described in the foregoing an indicating means responsive to electric effects is connected. This indicating means is shown as a sound reproducing means represented as a loud speaker 65. Other indicating means may be connected to the electric circuit outside the well, such other indicating means being shown as a sensitive recording meter 66.

A manner of use of the device 15 is illustrated in Fig. 1. By means of the cable 19 it has been lowered into the stuck pipe 10, and the position which it occupies, by way of example only, is with the lower member 17 adjacent the upper extremity of the set portion 10a of the pipe 10, and with the upper member 16 adjacent the lower end of the free portion 10b of the pipe. When the switch 59 is closed, current from the battery 60 will flow through the windings of the upper and lower electromagnets 34, causing the members 16 and 17 to become connected or attached to the adjacent portions of the pipe 10 through the action of the magnetic flux of the electromagnets 34 which pulls the electromagnets 34 laterally so as to produce pressural engagement of the edges of the plates 37 with the surface of the pipe 10 whereupon friction between these parts 37 and 10 will act when there is relative movement of the engaged portions of the pipe 10 to cause relative movement of the members 16 and 17. At the same time there will be a flow of current through the microphone 23 and the limiting resistance 24, so that whenever vibrations are transmitted to the microphone 23, fluctuations in the electrical circuit, including the conductors 57 and 61 of Fig. 1, will be produced and such fluctuations will be indicated to a workman at the top of the well either through sound reproduced by the loud speaker 65 or by fluctuations of the needle of the recording meter 66. It is evident that these fluctuations will vary in number in accordance with the magnitude of the relative movement of the members 16 and 17, since the greater the relative movement of the parts 16 and 17, the greater will be the number of vibrations produced by the scratching of the needle 55 on the surface of the part 44.

With the device 15 attached to the pipe 10 as shown in Fig. 1, an upward pull may be applied to the upper end of the pipe 10, causing a change in the stress applied through all portions of the free part 10b of the pipe. This will result in an elongation of the part of the pipe 10 between the upper and lower members 16 and 17, and, since these members 16 and 17 are firmly attached to base portions of the pipe 10, there will be relative movement of the parts 16 and 17, resulting from upward movement of the member 16 with the part of the pipe to which it is attached, while the lower member 17 is maintained stationary. This will cause the member 44 to move relatively to the needle 55, and the movement of the needle 55 relatively to the roughened surface of the member 44 will produce sound vibrations which will be picked up by the microphone 23, causing fluctuations in the electrical potential of the circuit which includes the conductors 57 and 61, these fluctuations then being perceived by the indicating instrumentalities 65 and 66. This will indicate to the observer that at least one of the members of the device 15 is attached to a free portion of the pipe 10. A steel pipe, by upward pull applied to its upper end may be readily elongated .005 inches per lineal foot, thereby producing ample relative movement of the upper and lower members 16 and 17 which are attached to a free portion of the pipe for actuation of the device in the manner described in the foregoing. It will be understood that whenever the device 15 is attached to the free portion of the pipe 10b, twisting of the pipe portion 10b will result in relative movement of the members 16 and 17 and the production of an indication thereof by the instrumentalities 65 and 66 outside the well, thereby indicating to the observer that the device is connected to a free or movable portion of the pipe in the well. When the device is lowered to a position wherein the lower member 17 is below the upper margin of the set portion 10a, as shown in Fig. 1, there will be a reduction in the magnitude of the signal received at the surface and when the upper member 16 is below the upper margin of the set portion 10a of the pipe 10, there will be no relative movement of the members 16 and 17 when an upward pull is applied to the upper end of the pipe 10 and therefore no indication of relative movement will be received by the observer at the top of the well, thus indicating to him that the device is attached to a stuck, immovable portion of the pipe. Accordingly, by lowering the device through consecutive positions of attachment along the pipe 10, the workman may make consecutive observations and may determine the point at which the pipe is stuck in the well.

For certain types of tests the upper member 16 of the device may be used alone, the lower member 17 being disconnected and the conductor 63, Fig. 2, connected to ground by connecting it directly to the grounded metal structure of the upper member 16. When this upper member 16 is lowered into the well and is attached to a part in the well through the magnetic attraction of the electromagnet 34 therein, the microphone 23 will receive sound vibrations produced by relative movement of parts in the well. For example, the sound produced by movement of a pipe in the formation will be picked up by the microphone and the sounds will be reproduced by the ear phones 65.

From the foregoing it will be perceived that only one means of attachment to a metal part within the well need be employed in the practice of the invention. In Fig. 7 I show an alternative form of the invention wherein a single means of attachment is employed. This single means of attachment consists of an anchor member identified by the numeral 16' for the reason that it may be an exact duplicate of the upper member 16 shown in Fig. 1. Projecting downwards from the member 16' there is an extension 70 having at its lower end means 71 for engaging a pipe wall 72 at a point spaced from the anchor member 16' and for scraping along the surface of the pipe wall 72 when the pipe wall is deformed. In Fig. 7 the electrical equipment associated with the testing device is shown schematically in external relation to the device. The anchor member 16' has an electromagnet 34 associated therewith of the character previously described, and associated with the means 71 at the lower end of extension 70 there is a variable resistance element which may consist of a microphone. A battery 60, a choke 58 and indicating devices 65' and 66' are in circuit with the elements 23 and 34, the device 65' being an indicator, such as a loud speaker, and the device 66' being a sensitive meter. When the anchoring member 16' is attached to the wall 72 of the pipe, elongation or torsional deformation of the wall 72 will cause the means 71 to move relatively to the portion of the wall 72 engaged thereby with a scratching or scraping action, such relative movement producing vibrations which in turn cause variations in the resistance of the resistance element 23, information of which is conveyed to the operator at the top of the well through the indicating devices 65' and 66'. When both of the parts 38 and 71 are above the stuck point the signal produced by the scratching action will be of maximum strength and duration, and as the device is progressively lowered from the position in which it is shown in Fig. 7, there will be a gradual decrease in the signal received at the top of the well, the signal ceasing entirely when both parts 38 and 71 are positioned below the stuck point, with the result that the decrease in the duration and strength of the signal is indicative of whether the device is above, straddling or below the stuck point.

I claim as my invention:

1. In a device of the character described, having parts adapted to be lowered into a well, the combination of: an anchor member; means for lowering the anchor member into the well; means operable to connect the anchor member to a part within the well; and means connected to said anchor member engaging and responding to relative movement of another part in the well to produce at the top of the well an indication of said relative movement.

2. In a device of the character described, having parts adapted to be lowered into a well, the combination of: an anchor member; means for lowering the anchor member into the well; means operable to connect the anchor member to a part within the well; means connected to said anchor member and responding to relative movement of another part in the well adjacent to said first part to produce an electrical effect of a magnitude corresponding to the magnitude of said relative movement; means for transmitting said electrical effect to the top of the well; and means responding to said electrical effect to produce an indication of said relative movement and its magnitude.

3. In a device of the character described, having parts adapted to be lowered into a well, the combination of: an anchor member; means for lowering the anchor member into the well; means operable to connect the anchor member to a part within the well; means connected to said anchor member and responding to relative movement of another part in the well adjacent to said first part to produce sound vibrations; and means for conveying said sound vibrations to the top of the well so as to produce at the top of the well a sensible indication of said relative movement.

4. In a device of the character described, having parts adapted to be lowered into a well, the combination of: an anchor member; means for lowering the anchor member into the well; means operable to connect the anchor member to a part within the well; and means connected to said anchor member and responding to relative movement of another part in the well to produce at the top of the well a sound which constitutes a sensible indication of said relative movement.

5. In a device of the character described, having parts adapted to be lowered into a well, the combination of: an anchor member; means for lowering the anchor member into the well; means operable to connect the anchor member to a part within the well; means connected to said anchor member and responding to relative movement of another part in the well adjacent to said first part to produce an indication of said relative movement; and means for transmitting to the top of the well a signal denoting said indication.

6. In a device of the character described, having parts adapted to be lowered into a well, the combination of: an anchor member; means for lowering the anchor member into the well; means operable to connect the anchor member to a part within the well; an electrical resistance means in the well in operative relation to said anchor member; means connected to said anchor member and responding to relative movement of another part in the well to change the value of said resistance means; an electrical circuit including said resistance means, said circuit extending to the top of the well; and means responding to changes in the electrical potential in said circuit to produce a signal indicative of said relative movement.

7. In a device of the character described, having parts adapted to be lowered into a well, the combination of: a pair of members connected together in movable relation; an electromagnet on each of said members for causing its attachment to an adjacent metal wall in the well, each of said electromagnets consisting of a vertically elongated core of U-shaped cross section with a coil of wire wound thereon; means controlled from the outside of the well for energizing said electromagnets; and means responsive to relative movement of said members for imparting to an operator outside the well an indication of said relative movement.

8. In a device having parts adapted to be lowered into a well for determining whether a portion of a tubular member in the well is movable, the combination of: an attachment member; means for lowering the attachment member into the well; means operable to connect the attachment member to a part of said tubular member within the well; means connected with said attachment member and engaging another part of said tubular member in spaced relation to said first named part within the well; and means responsive to relative movement of said spaced parts of said tubular member in the well to produce an indication thereof.

9. In a device having parts adapted to be lowered into a well for determining whether a portion of a tubular member in the well is movable, the combination of: an attachment member; means for lowering the attachment member into said tubular member in the well; electrical means operable to connect the attachment member to a part of said tubular member within the well; and means carried by said attachment member for sensing relative movement of another part of said tubular member spaced from said first named part in the well, said sensing means comprising a member carried by said attachment member and brought into engagement with said other part of said tubular member when said electrical means is operated and having means for varying an electric value which means is sensitive to relative movement of said parts of said tubular member to produce a signal in response to such relative movement.

10. In a device having parts adapted to be lowered into a well for determining whether a portion of a tubular member in the well is movable, the combination of: a pair of members connected together in movable relation; means for moving said members down into the well to selected positions; means for connecting each of said members to a different part of a localized portion of said tubular member in the well; and means responsive to relative movement of said members for imparting to an operator outside the well an indication of said relative movement.

11. In a device having parts adapted to be lowered into a well for determining whether a portion of a tubular member in the well is movable, the combination of: a pair of members connected together in movable relation; means for moving said members down into the well to selected positions; electrical means for effecting engagement of said members with spaced portions of a localized section of said tubular member in the well; means controlled from outside the well for delivering electric current to said electrical means to actuate the same; and means sensitive to relative movement of said relatively movable members adapted to produce a signal as an indication of said relative movement.

12. In a device of the character described for determining whether a portion of a tubular member in a well is movable, the combination of: a device having spaced elements thereon for engaging spaced parts of a localized portion of the tubular member in the well when the device is lowered in the well; means for moving said device into selected positions in a well; means for bringing at least one of said elements into holding engagement with the tubular member within the well; and electrical means responding to change in the relative position of said parts as the result of change in the stress in said tubular member to indicate movability of said localized portion of said tubular member.

13. In means for determining the points at which a pipe is in free or stuck condition in a well, for use with a means for applying motion to a portion of the pipe spaced from the point in the well at which the pipe is stuck so that motion will be produced in the pipe which is indicative of movability of the pipe: a member adapted to be lowered into the well; suspension means for moving said member from place to place in the well; means for effecting engagement of said member with the pipe in the well so that the said motion of the pipe will be transmitted to said member; signal producing means suspended by said suspension means and operatively connected to said member, said signal producing means having a part supported in movable relation to said member and engaging said pipe under influence of said engagement effecting means so that movement of said member by said pipe will effect relative movement of said part and said member, said signal producing means operating in consequence of said relative movement to control an electrical value representative of said motion transmitted from said pipe to said member; means for transmitting said electrical value from said electrical means to the surface; and electro-responsive indicating means at the surface of the ground to receive said value and indicate movability of the portion of the pipe contiguous to said member.

14. In a testing device adapted to be lowered into a well for determining whether a portion of a member in the well is movable: an organization comprising relatively movable parts adapted to be lowered into the well; means for moving said organization in the well; means operative to support said organization in the well independently of said first named means and for effecting engagement of at least one of said parts with a selected portion of the member in the well so that movement of said portion will produce relative movement of said parts; means for controlling said independent supporting means while said organization is in the well and means responsive to said relative movement of said parts in the well to produce an indication of movement of said portion of said member.

15. In a device for determining which portions of a pipe stuck in a well are movable, an organization adapted to be lowered into said pipe to selected positions, said organization having at least one member adapted to engage a selected portion of said pipe and comprising: means operative to move said organization from place to place in the well; means for effecting engagement of said member with a selected portion of the pipe for supporting said member independently of said first-named means so that movement of said selected portion will be transmitted to and cause movement of said member; and electrical movement sensing means in said organization in the well, adapted to produce an electrical signal in consequence of said movement of said member, and means at the surface of the ground connected to said sensing means and adapted to indicate said signal.

16. In a device for determining which portions of a pipe stuck in a well are movable, an organization adapted to be lowered into said pipe to selected positions, said organization having at least one member adapted to engage a selected portion of said pipe and comprising: means operative to move said organization from place to place in the well; means for effecting engagement of said member with a selected portion of the pipe and for supporting said member independently of said first-named means so that movement of said selected portion will be transmitted to and cause movement of said member; and electrical movement sensing means in said organization in the well, adapted to produce an electrical signal in consequence of said movement of said member.

17. Apparatus for ascertaining whether a pipe is free or stuck at various zones within a well comprising an attachment member, means for lowering said attachment member into a well, means for attaching said member to a pipe within the well for movement with the portion of the pipe to which the member is attached, electrical means carried by said member and responsive to movement of said member to effect a variation in an electrical value, and means for transmitting an indication of the variation in such electrical value to the surface of the earth.

PHILIP W. MARTIN.

REFERENCES CITED

The following references are of record in the file of this patent:

UNITED STATES PATENTS

| Number | Name | Date |
| --- | --- | --- |
| 1,654,819 | Kinley | Jan. 3, 1928 |
| 2,040,874 | Pack | May 19, 1936 |
| 2,045,474 | Kemler | June 23, 1936 |
| 2,092,316 | Lane | Sept. 7, 1937 |
| 2,300,384 | Johnston | Oct. 27, 1942 |
| 2,396,935 | Walstrom | Mar. 19, 1946 |